(12) United States Patent
Adleman et al.

(10) Patent No.: US 12,176,949 B2
(45) Date of Patent: Dec. 24, 2024

(54) LINEARIZATION OF ELECTRO-OPTIC LINKS

(71) Applicant: United States of America as represented by the Secretary of the Navy, San Diego, CA (US)

(72) Inventors: James Richard Adleman, San Diego, CA (US); Sanja Zlatanovic, San Diego, CA (US); David Chao, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 249 days.

(21) Appl. No.: 17/957,068

(22) Filed: Sep. 30, 2022

(65) Prior Publication Data

US 2024/0113783 A1    Apr. 4, 2024

(51) Int. Cl.
  *H04B 10/2543*    (2013.01)
  *H04B 10/40*      (2013.01)
  *H04B 10/54*      (2013.01)

(52) U.S. Cl.
  CPC ......... *H04B 10/2543* (2013.01); *H04B 10/40* (2013.01); *H04B 10/54* (2013.01)

(58) Field of Classification Search
  CPC ..... H04B 10/2543; H04B 10/40; H04B 10/54
  USPC ........................................................ 398/140
  See application file for complete search history.

(56) References Cited

U.S. PATENT DOCUMENTS

| 11,294,111 | B1 * | 4/2022 | Esman | H04B 10/2575 |
| 2003/0102938 | A1 * | 6/2003 | Erlig | H03D 9/00 |
| | | | | 333/156 |
| 2004/0218259 | A1 * | 11/2004 | Hui | G02F 1/2257 |
| | | | | 359/344 |
| 2018/0026723 | A1 * | 1/2018 | Ackerman | H04B 10/588 |
| | | | | 398/198 |

(Continued)

FOREIGN PATENT DOCUMENTS

| EP | 1168042 B1 * | 11/2006 | G02F 2/02 |
| WO | WO-2015127478 A1 * | 8/2015 | H04B 10/2543 |

OTHER PUBLICATIONS

Ackerman ; Broad-Band Linearization of a Mach-Zehnder Electrooptic Modulator; Dec. 1999; IEEE; pp. 1-9. (Year: 1999).*

(Continued)

*Primary Examiner* — Amritbir K Sandhu
(74) *Attorney, Agent, or Firm* — Naval Information Warfare Center, Pacific; Kyle Eppele; J. Eric Anderson

(57) ABSTRACT

A radio frequency (RF) transceiver comprising: a transmitter configured to produce a plurality of optical carriers; a multi-wavelength electro-optic modulator configured to receive the plurality of optical carriers from the transmitter, wherein the electro-optic modulator is configured to modulate each optical carrier using a same input RF signal, but with a different efficiency for each optical carrier so as to generate an arbitrary number of RF links with various efficiencies using a single modulation electrode; and a receiver designed to produce a synthesized transfer function based on a truncated Fourier Series and configured to use the synthesized transfer function to adjust intermodulation distortion response to optimize dynamic range for the transceiver's operating resolution bandwidth and noise characteristics.

1 Claim, 3 Drawing Sheets

(56) References Cited

U.S. PATENT DOCUMENTS

| | | | | |
|---|---|---|---|---|
| 2018/0219633 A1* | 8/2018 | Kanter | ............... | H04B 10/2575 |
| 2019/0212472 A1* | 7/2019 | Tennant | ................. | H04B 10/50 |
| 2020/0409229 A1* | 12/2020 | Morton | ................... | G02F 1/212 |
| 2024/0113783 A1* | 4/2024 | Adleman | ........... | H04B 10/2543 |

OTHER PUBLICATIONS

Kumar et al; Chirped fiber grating and specialty fiber based multiwavelength optical beamforming network for 1X8 phased array antenna in S-band; Jun. 2021; Optik—International Journal for Light and Electron Optics; pp. 1-12. (Year: 2021).*

Bhatia et al; Linearization of phase-modulated analog links using four-wave mixing in an optical comb source-; Dec. 2014; Optical Society of America; pp. 1-11. (Year: 2014).*

Aldeman et al; Analysis of RF Photonic Link Linearization Using Truncated Fourier Series; Oct. 2019; IEEE; pp. 1-4. (Year: 2019).*

J. Adleman et al.; Analysis of RF Photonic Link Linearization Using Truncated Fourier Series; 2019 International Topical Meeting on Microwave Photonics (MWP), 2019.

McKenna, Timothy P., Jean H. Kalkavage, Thomas R. Clark, Rod B. Waterhouse, and Dalma Novak. "Photonic downconverting link with digital linearization." In 2015 IEEE MTT-S International Microwave Symposium, pp. 1-4. IEEE, 2015.

E. I. Ackerman, "Broad-band linearization of a Mach-Zehnder electrooptic modulator", IEEE Trans. Microw. Theory Tech., vol. 47, No. 12, pp. 2271-2279, 1999.

A. Bhatia, H. Ting, and M. A. Foster, "Linearization of phase-modulated analog optical links using a four-wave mixing comb source," Opt. Express, vol. 22, No. 25, pp. 30899-30909, 2014.

A. Bhatia, H-F Ting, and M,A, Foster "All-optical multiorder distortion elimination in a phase-modulated microwave photonic link," J. Lightw. Technol. vol. 34, No. 4, 2017.

* cited by examiner

LINEARIZATION OF ELECTRO-OPTIC LINKS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 114162.

BACKGROUND OF THE INVENTION

This invention relates to the field of radio frequency (RF) transceivers and methods of electro-optic modulation. There is a need for an electro-optic modulator with an improved linear response to increase dynamic range of analog communications and signal processing systems.

SUMMARY

Disclosed herein is an RF transceiver comprising a transmitter, a multi-wavelength electro-optic modulator, and a receiver. The transmitter is configured to produce a plurality of optical carriers. The multi-wavelength electro-optic modulator is configured to receive the plurality of optical carriers from the transmitter. The multi-wavelength electro-optic modulator is also configured to modulate each optical carrier using a same input RF signal, but with a different efficiency for each optical carrier so as to generate an arbitrary number of RF links with various efficiencies using a single modulation electrode. The receiver is designed to produce a synthesized transfer function based on a truncated Fourier Series. The receiver is further configured to use the synthesized transfer function to adjust intermodulation distortion response to optimize dynamic range for the transceiver's operating resolution bandwidth and noise characteristics.

Also disclosed herein is method for electro-optic modulation of an RF signal comprising the following steps. One step provides for producing multiple optical carriers with a transmitter. Another step provides for using a multi-wavelength modulator designed to produce a synthesized transfer function based on a truncated Fourier Series to modulate each optical carrier with an input RF signal such that each optical carrier is modulated with the same input RF signal but with a different efficiency. Another step provides for transmitting the modulated optical carriers over an optical fiber. Another step provides for receiving the modulated optical carriers with a receiver. Another step provides for combining the modulated optical carriers with a photodetector so as to produce an output current I(t) that may be characterized by:

$$I(t) = I_0\left(1 + \sum_{n=1}^{N} |C_n|\sin[\kappa_n V(t) + \phi_b]\right)$$

where $I_0$ is a direct current (DC) photocurrent from the photodetector, N is a total number of optical carriers, n is a summation index, $C_n$ is a coefficient, $\kappa_n$ is a proportionality constant representing a modulation process efficiency, V(t) is a modulation voltage at time t, and $\phi_b$ is a modulator optical phase bias such that a description of a given composite modulation link can be reduced to specifying the parameters: $I_0$, $\kappa_n$, and $C_n$ where $\kappa_n$=n $\kappa_1$. $C_n$ can be found by determining a truncated Fourier series expansion approximating a target triangular function represented by the Fourier coefficients $B_n$ as follows $$B_n = \left\{0 \text{ for even } n, \; \frac{j^{n-1}}{n^2} \text{ for odd } n\right\}$$

where j is given by the square root of negative one. The $C_n$ coefficients are calculated by multiplying the $B_n$ coefficients by a window function/weighting filter $W_n$. The window function/weighting filter $W_n$ is a coefficient chosen using a window function to minimize the distortion due to the truncation error introduced by limiting the length of the $C_n$ series to N terms. The window function is selected to produce a transceiver response that trades off a strength of intermodulation products at intermediate powers.

Another embodiment of the RF transceiver is disclosed herein as comprising a transmitter, a modulator, a receiver, and a photodetector. The transmitter is configured to produce multiple optical carriers. The modulator is configured to modulate each optical carrier with an input RF signal. Each optical carrier is modulated with the same input RF signal but with a different efficiency for each optical carrier to create a plurality of modulated optical signals. The receiver is configured to receive the plurality of modulated optical signals via an optical fiber and to select amplitude coefficients of the optical carriers using a truncated, windowed Fourier series. The photodetector is configured to combine the plurality of modulated optical signals and to produce an output current.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and transceivers below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
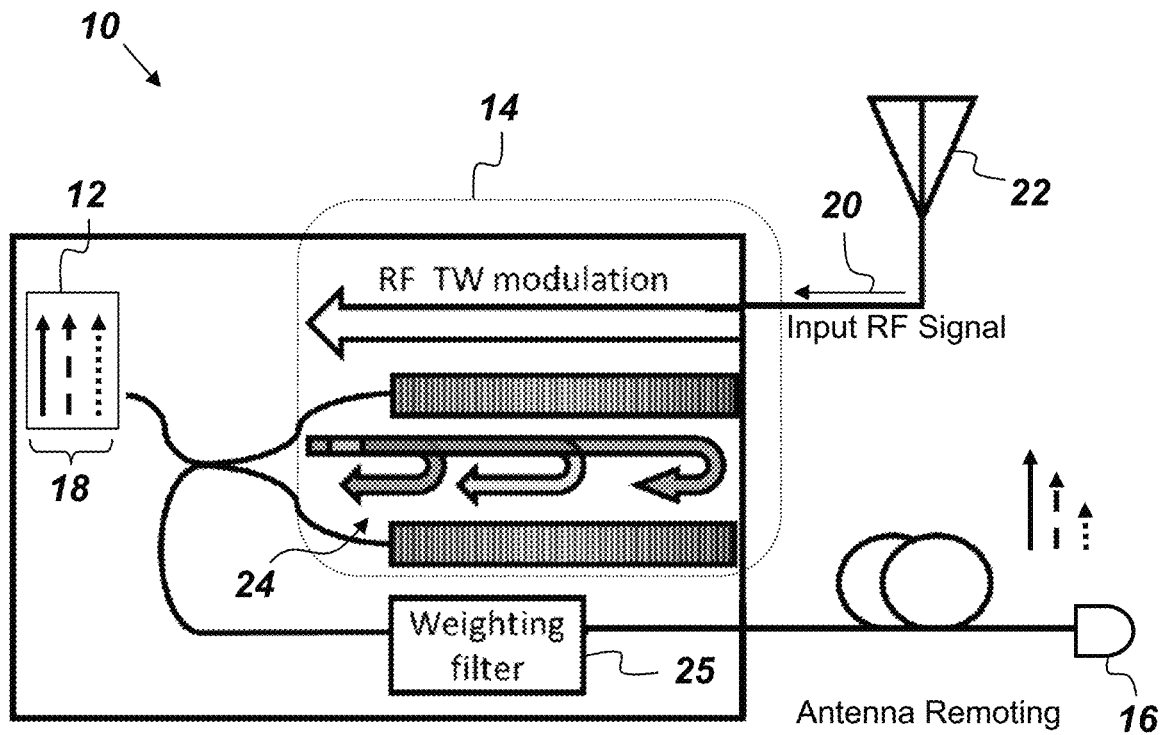
FIG. 1 is a block diagram of a transceiver for electro-optic modulation of an RF signal.
Figure 1:
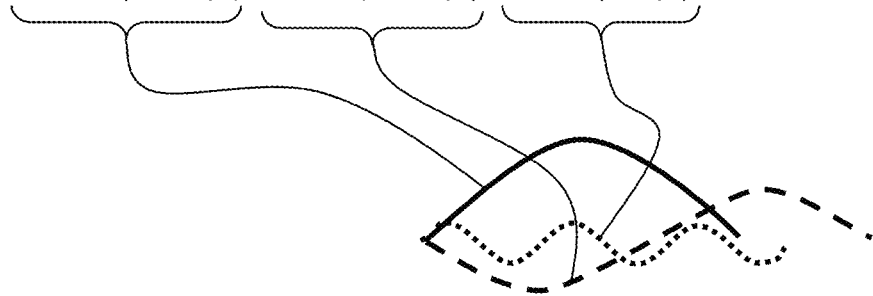

FIG. 1 is a block diagram of an embodiment of an RF transceiver 10 that comprises, consists of, or consists essentially of a transmitter 12, a multi-wavelength electro-optic modulator 14, and a receiver 16. The transmitter 12 is configured to produce a plurality of optical carriers 18. The multi-wavelength electro-optic modulator 14 is configured to receive an input RF signal 20 (depicted in FIG. 1 as coming from an antenna 22). The multi-wavelength electro-optic modulator 14 is also configured to receive the plurality of optical carriers 18 from the transmitter 12 and to modulate each optical carrier 18 using the same input RF signal, but with a different efficiency for each optical carrier so as to generate an arbitrary number of RF links 24 with various efficiencies using a single modulation electrode. The optical carriers may use a distinct polarization, spatial or spectral mode as compared to each other. The arbitrary number of RF links 24 may all have the same phase. The receiver 16 (shown as a photodetector in FIG. 1) is designed to produce a synthesized transfer function based on a truncated Fourier Series and to use the synthesized transfer function to adjust intermodulation distortion response to optimize dynamic range for the transceiver's operating resolution bandwidth and noise characteristics.

The transceiver 10 may be used to enable a method of electro-optic modulation with increased dynamic range and lower nonlinear distortion of modulated signals than was previously possible. Transceiver 10 may be used to implement radio-over-fiber links to transmit RF microwave and millimeter wave signals with sufficient dynamic range for very broadband data communications. Useful dynamic range of analog communications and signal processing systems is limited by nonlinear distortion. Dynamic range of a component or system can be improved by reducing its transfer function's deviation from linearity across the range of the input signals. The electro-optic modulator 14, which converts the electrical RF input signal to a photonic signal in an analog photonic link, produces the dominant nonlinear response that limits system dynamic range. Transceiver 10's electro-optic modulator (i.e., the multi-wavelength electro-optic modulator 14) has a highly linear response, which is desirable to increase dynamic range.

In one embodiment, the multi-wavelength electro-optic 14 modulator comprises a dispersive optical waveguide that has a modulation efficiency that is dependent on wavelength. As such, harmonic responses can be produced by the multi-wavelength electro-optic modulator 14 using a multi-wavelength carrier. The dispersive optical waveguide may comprise a concatenated or chirped Bragg grating waveguide such that each carrier wavelength gets reflected from a different location in the Bragg grating waveguide. In another embodiment, the electro-optic modulator 14 may be a single modulator structure that does not include an optical mixer. The multi-wavelength modulator 14 may be configured to allow distortion orders at levels below a noise floor of the receiver 16.

Figure 2:
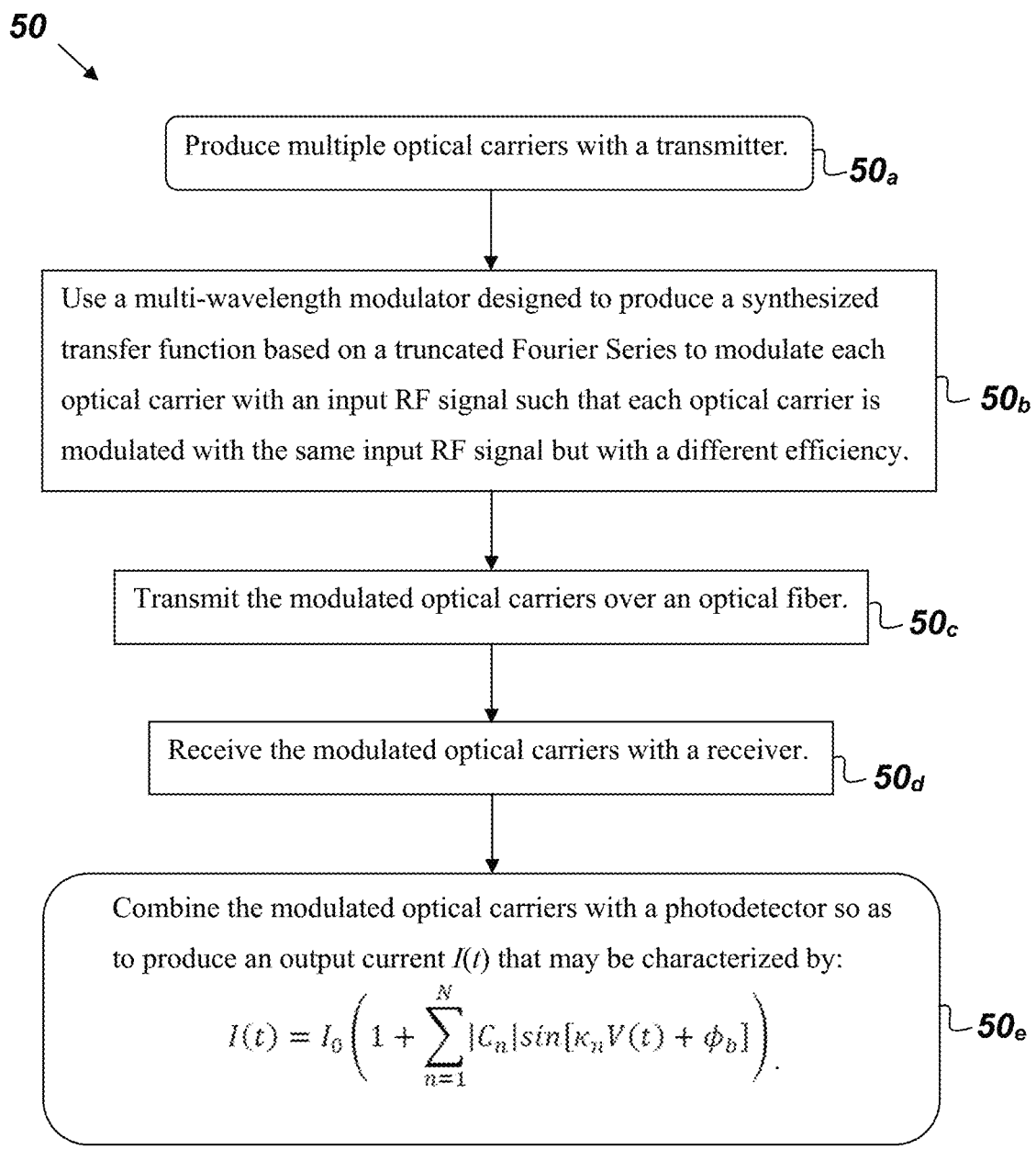
FIG. 2 is a flowchart of a method for electro-optic modulation of an RF signal.

FIG. 2 is a flowchart of a method 50 for electro-optic modulation of an RF signal comprising the following steps. The first step $50_a$ provides for producing multiple optical carriers with a transmitter. The transmitter may use any known method of producing the multiple optical carriers including, but not limited to, using multiple lasers to produce the multiple optical carriers; using an electro-optic comb to produce the multiple optical carriers; and using a parametric comb to produce the multiple optical carriers. The optical carriers may be produces such that they have a distinct polarization, spatial or spectral mode as compared to each other. Another step $50_b$ provides for using a multi-wavelength modulator designed to produce a synthesized transfer function based on a truncated Fourier Series to modulate each optical carrier with an input RF signal such that each optical carrier is modulated with the same input RF signal but with a different efficiency. Another step $50_c$ provides for transmitting the modulated optical carriers over an optical fiber. Another step $50_d$ provides for receiving the modulated optical carriers with a receiver. Another step $50_e$ provides for combining the modulated optical carriers with a photodetector so as to produce an output current I(t) that may be characterized by:

$$I(t) = I_0 \left( 1 + \sum_{n=1}^{N} |C_n| \sin[\kappa_n V(t) + \phi_b] \right) \quad \text{(Eq. 1)}$$

In Equation 1, $I_0$ is a DC photocurrent from the photodetector, N is a total number of optical carriers, n is a summation index, $C_n$ is a coefficient, $\kappa_n$ is a proportionality constant representing a modulation process efficiency, V(t) is a modulation voltage at time t, and $\phi_b$ is a modulator optical phase bias. A description of a given composite modulation link can be reduced to specifying the parameters: $I_0$, $\kappa_n$, and $C_n$ where $\kappa_n = n \kappa_1$, wherein $C_n$ can be found by determining a truncated Fourier series expansion approximating a target triangular function represented by the Fourier coefficients $B_n$ as follows:

$$B_n = \left\{ 0 \text{ for even } n, \ \frac{j^{n-1}}{n^2} \text{ for odd } n \right\} \quad \text{(Eq. 2)}$$

In Equation 2, j is given by a square root of negative one. The $C_n$ coefficients may be calculated by multiplying the $B_n$ coefficients by a window function/weighting filter $W_n$. The window function/weighting filter $W_n$ (See weighting filter 25 shown in FIG. 1) is a coefficient chosen using a window function to minimize the distortion due to the truncation error introduced by limiting the length of the $C_n$ series to N terms. The window function may be selected to produce a transceiver response that trades off a strength of intermodulation products at intermediate powers.

Figure 3:
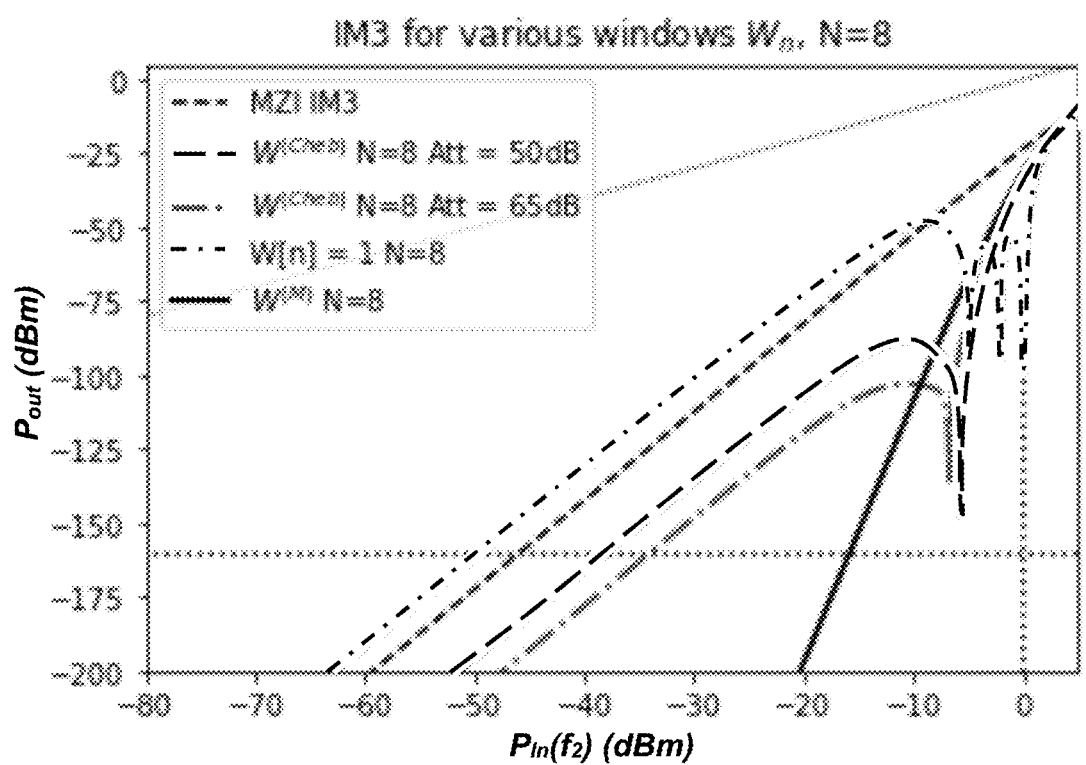
FIG. 3 is a plot of the third-order intermodulation products of a transceiver for electro-optic modulation of an RF signal.

FIG. 3 is a plot of the third-order intermodulation products of the transceiver 10 at various windowing conditions, which shows the effect of the various windows on the spur-free dynamic range (SFDR) of the transceiver 10. For example, the 8-term Taylor expansion window $W^{[m]}$ shows a monotonically increasing intermodulation with input power. The windowed and truncated Fourier series results $W^{[Cheb]}$, go through a sharp minimum and a change in slope as power increases from −9 to −3 dBm. Although SFDR at a receiver resolution bandwidth (RBW) of 1 Hz RBW is 20 dB worse than the Taylor methods ($W^M$), if the system noise floor was set at −100 dBm, (e.g. approximately 10 MHz resolution bandwidth) the effective SFDR would be −5 dB better than Taylor method. In some embodiments of method 50 and the transceiver 10, it is desirable to select the synthesized transfer function to provide improved SFDR across a given RBW by suppressing nonlinear mixing processes to increase an input power required to produce a detectable spur at a second or third order intermodulation.

The SFDR for a given RF photonic link is characterized by the difference in dB from the minimum input signal power detectable at the output, to the minimum input signal power that produces a spurious intermodulation at the output. Depending on the link transfer function, the largest spur is produced either at the frequency of the second order intermodulation (f_IM2) or the frequency of the third order intermodulation (f_IM3). In wideband RF photonic links spanning more than an octave, one may set the bias point of the interferometer to the quadrature point, which minimizes the effect of even order non-linearities, so that the odd order nonlinearities define the SFDR.

Method 50 may be used to suppress nonlinear response of the transceiver 10 close to the noise floor, which could not be achieved using a simple Taylor expansion or Fourier expansion. The nonlinear response can be suppressed to a desired noise floor level based on the selection of the number of optical carriers and the windowing function used in generation of the arbitrary number of RF links. In one embodiment, the optical carriers may be produced by an array of hybrid integrated lasers, electro-optically generated optical combs, or optical pulse sources such as mode-locked lasers or soliton resonators. The transceiver 10 and the method 50 do not require nonlinear optical waveguides to perform the multiplication/optical modulation required by prior art devices, and do not require multiple carrier combs to operate the transmitter in an intensity modulation direct detection (IMDD) scheme.

In one embodiment of the transceiver 10, the multi-wavelength electro-optic modulator 14 is configured to implement a distinct group delay for each optical carrier 24. For instance, a ring-filter-based add/drop method could be used instead of a grating structure to provide wavelength dependent reflection of the carriers. In embodiments of the transceiver 10 where grating structures are used to provide wavelength dependent reflection of the carriers, suitable examples of the grating include, but are not limited to, an index-modulated waveguide, a sidewall corrugated waveguide, a periodic cladding modulated grating, and an induced grating via the DC electro-optic effect. Desired group delay can also be accomplished through dispersion engineering, which may be implemented, for example, by tailoring waveguide geometry or by utilizing waveguide materials with high dispersion, or by exploring polarization anisotropy of waveguide materials. The waveguides of the multi-wavelength electro-optic modulator 14 may be fabricated by a variety of photonic integrated circuit technologies in any desired material including, but not limited to, bulk lithium niobite, thin film lithium niobite on Silicon or Silicon nitride, III-V (e.g. indium phosphide-based photonic integrated circuit (PIC)), and hybrid integrated III-V on Silicon or silicon nitride.

The transmitter 12 may be integrated on chip or provided from a separate discrete or integrated laser module. The optical carriers could be generated from independent free running laser structures, a laser bank locked together using optical phase lock loop or optical injection locking, or generated using nonlinear comb generation, either in a single pass or resonant structure pumped by a master laser oscillator. The weighting filter 25 can be integrated on the same PIC, or a separate PIC or discrete module. Variable weights can be accomplished by any manner of tunable optical filter, including, but not limited to, ring filters, Fabry-Perot filters, liquid crystal light valves, and spatial light modulators. The target transfer function can be chosen either to minimize nonlinearity of the modulator itself or to provide compensation for other nonlinear elements in the signal chain, to linearize the overall response of the receiver 16. The transfer function and window weights can set via one-time calibration, or continually updated by open loop (e.g. look up table) methods, or closed loop methods that optimize the weighting based on the current receiver output. The optimum weights can be set using either classical optimization methods, or by machine learning and training. Method 10 can be extended to composite modulation schemes that do not have a harmonic relationship between individual carrier modulation efficiencies by using interpolation onto an irregular grid.

From the above description of the transceiver and method for electro-optic modulation of an RF signal, it is manifest that various techniques may be used for implementing the concepts of transceiver 10 and method 50 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that transceiver 10 and method 50 are not limited to the particular embodiments described herein, but is capable of many embodiments without departing from the scope of the claims.

We claim:
1. A radio frequency (RF) transceiver comprising:
a transmitter configured to produce a plurality of optical carriers;
a multi-wavelength electro-optic modulator configured to receive the plurality of optical carriers from the transmitter, wherein the electro-optic modulator is configured to modulate each optical carrier using a same input RF signal, but with a different efficiency for each optical carrier so as to generate an arbitrary number of RF links with various efficiencies using a single modulation electrode;
a receiver designed to produce a synthesized transfer function based on a truncated Fourier Series and configured to use the synthesized transfer function to adjust intermodulation distortion response to optimize dynamic range for the transceiver's operating resolution bandwidth and noise characteristics;
wherein the multi-wavelength electro-optic modulator comprises a dispersive optical waveguide and wherein the multi-wavelength electro-optic modulator has a modulation efficiency that is dependent on wavelength, such that harmonic responses can be produced by the multi-wavelength electro-optic modulator using a multi-wavelength carrier;
wherein the dispersive optical waveguide comprises a concatenated or chirped Bragg grating waveguide such that each carrier wavelength gets reflected from a different location in the Bragg grating waveguide;
wherein the electro-optic modulator is a single modulator structure that does not include an optical mixer; and
wherein the arbitrary number of RF links with various efficiencies are all in-phase with each other.

* * * * *